(12) United States Patent
Lipton et al.

(10) Patent No.: US 6,760,409 B1
(45) Date of Patent: *Jul. 6, 2004

(54) METHOD AND SYSTEM FOR ORDERING A TELECOMMUNICATION SERVICE

(75) Inventors: Marc Ira Lipton, Lincolnshire, IL (US); Gregory John Dunny, St. Charles, IL (US)

(73) Assignee: SBC Properties, L.P., Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 09/490,018

(22) Filed: Jan. 21, 2000

Related U.S. Application Data

(63) Continuation of application No. 08/942,342, filed on Oct. 1, 1997, now Pat. No. 6,041,104.

(51) Int. Cl.[7] .................. H04M 1/64; H04M 11/00; H04M 3/00
(52) U.S. Cl. .................. 379/67.1; 379/76; 379/88.13; 379/88.17; 379/93.12; 379/201.01; 379/207.11; 379/265.01; 379/266.07
(58) Field of Search .................. 379/67.1, 72, 76, 379/88.05, 88.06, 88.13, 88.17, 88.18, 93.12, 93.23, 114.01, 114.05, 201.01, 201.02, 201.03, 201.12, 207.11, 265.01, 265.09, 266.07

(56) References Cited

U.S. PATENT DOCUMENTS

| | | | |
|---|---|---|---|
| 4,232,199 A | 11/1980 | Boatwright et al. | 379/197 |
| 4,782,519 A | 11/1988 | Patel et al. | 379/201.05 |
| 4,979,206 A | 12/1990 | Padden et al. | 379/88.01 |
| 5,023,904 A | 6/1991 | Kaplan et al. | 379/91.02 |
| 5,136,633 A * | 8/1992 | Tejada et al. | 379/91 |
| 5,222,125 A | 6/1993 | Creswell et al. | 379/114.05 |
| 5,253,165 A | 10/1993 | Leiseca et al. | 705/5 |
| 5,345,501 A * | 9/1994 | Shelton | 379/89 |
| 5,416,833 A | 5/1995 | Harper et al. | 379/201.05 |
| 5,491,742 A | 2/1996 | Harper et al. | 379/201.12 |
| 5,504,933 A | 4/1996 | Saito | 725/1 |
| 5,509,060 A | 4/1996 | Hall et al. | 379/207.02 |
| 5,528,677 A | 6/1996 | Butler et al. | 379/196 |
| 5,561,706 A | 10/1996 | Fenner | 455/406 |
| 5,583,920 A | 12/1996 | Wheeler, Jr. | 379/88.01 |
| 5,608,446 A | 3/1997 | Carr et al. | 725/114 |
| 5,619,562 A | 4/1997 | Maurer et al. | 379/201.05 |
| 5,644,619 A | 7/1997 | Farris et al. | 379/29.01 |
| 5,661,784 A | 8/1997 | Zinke | 379/88.01 |
| 5,719,921 A | 2/1998 | Vysotsky et al. | 379/88.01 |
| 5,757,904 A | 5/1998 | Anderson | 379/265.06 |
| 5,761,288 A | 6/1998 | Pinard et al. | 379/201.03 |
| 5,974,441 A * | 10/1999 | Rogers et al. | 709/200 |
| 6,169,787 B1 * | 1/2001 | Shimada et al. | 379/91 |
| 6,529,602 B1 * | 3/2003 | Walker et al. | 380/283 |
| 6,560,328 B1 * | 5/2003 | Bondarenko et al. | 379/265.02 |

* cited by examiner

*Primary Examiner*—Allan Hoosain
(74) *Attorney, Agent, or Firm*—Brinks Hofer Gilson & Lione

(57) ABSTRACT

A method of providing a session for ordering a telecommunication service includes receiving a telecommunication call for ordering the telecommunication service, communicating a prerecorded terms and conditions message for the telecommunication service to an individual ordering the telecommunication service, and receiving a reply message to the terms and conditions message from the individual. The prerecorded terms and conditions message is communicated to the individual and the reply message is received during the telecommunication call. A system for providing the session is disclosed.

30 Claims, 2 Drawing Sheets

METHOD AND SYSTEM FOR ORDERING A TELECOMMUNICATION SERVICE

CROSS REFERENCE TO RELATED APPLICATION

The present application is a continuation of U.S. application Ser. No. 08/942,342, filed Oct. 1, 1997 now U.S. Pat. No. 6,041,104, entitled "METHOD AND SYSTEM FOR ORDERING A TELECOMMUNICATION SERVICE". The disclosure of the aforementioned parent application is hereby incorporated by reference into the disclosure of the present application.

TECHNICAL FIELD

The present invention relates to methods and systems for ordering telecommunication services.

BACKGROUND OF THE INVENTION

Various telecommunication services, including telephone services, are presently regulated using a tariff system. With the tariff system, telecommunication companies provide regulated telecommunication services under terms and conditions set forth in a publicly-available document. Under this system, subscribers can order the regulated telecommunication services without having to sign a service contract with the telecommunication company. Further, the subscribers can view the terms and conditions at a public office of the telecommunication company.

Increased competition in telecommunications may reduce the need for many regulations, including tariffs. In this environment, it is desirable to fully and accurately convey the terms and conditions of an untariffed telecommunication service to a subscriber without requiring the subscriber to sign a service contract.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE PREFERRED EMBODIMENTS

Embodiments of the present invention provide methods and systems for ordering a telecommunication service which communicate a terms and conditions message to a potential subscriber prior to completing an order. The message can recite an entire terms and conditions contract, or can recite only critical terms of the contract. The potential subscriber is required to perform an action (such as pressing a digit) to affirmatively accept the contract. Data generated during a service-ordering session is stored in a database to verify and to document that the subscriber has affirmatively agreed to the terms and conditions of their contract.

Figure 1:
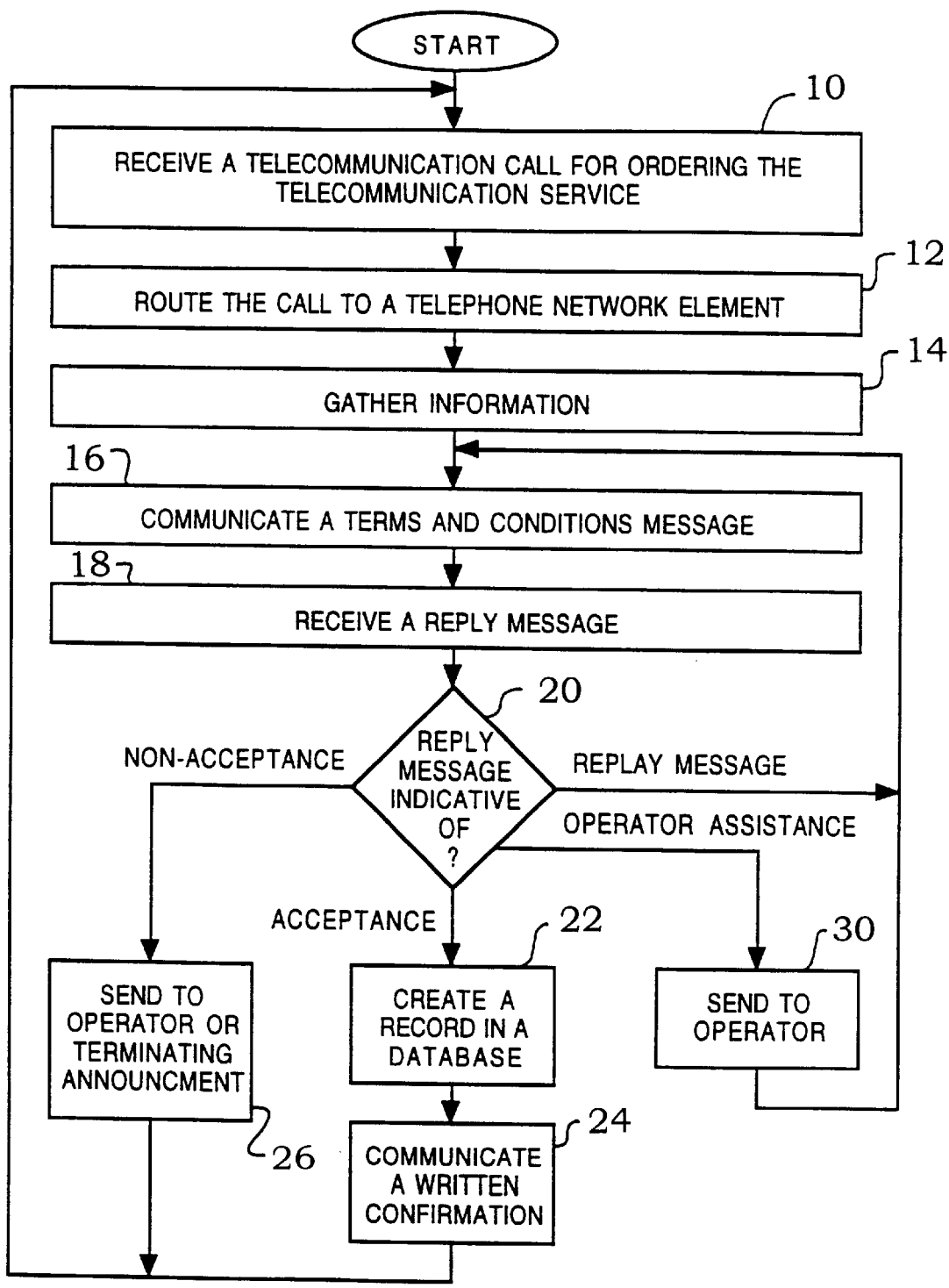
FIG. 1 is a flow chart of an embodiment of a method of processing an order for a telecommunication service.

FIG. 1 is a flow chart of an embodiment of a method of providing a session for ordering a telecommunication service. As indicated by block 10, the method includes a step of receiving a telecommunication call for ordering or establishing the telecommunication service. The telecommunication call is placed by an individual who orders the telecommunication service. Preferably, the telecommunication call includes a telephone call received via a telecommunication network such as a public switched telephone network (PSTN).

Examples of the telecommunication service being ordered include, but are not limited to, basic telephone services and optional telephone services. Examples of basic telephone services include but are not limited to basic land line telephone services and basic cellular telephone services. Examples of optional telephone services include but are not limited to caller identification services, voice mail services, call waiting services, call forwarding services, three-way calling, repeat dialing, automatic call back. The telecommunication service can be a residential service or a business service.

As indicated by block 12, a step of routing the call to a telephone network element is performed. As indicated by block 14, a step of gathering information from the individual is performed via the telephone network element.

The telephone network element is used to elicit, from the individual, information required to initiate a subscription to the service. The information includes subscriber identification information such as a billing name, a billing address, a telephone number, and/or a name of the individual. The billing name can include the name of a business, the name of the individual, or the name of another individual. The billing address can include a business address or a residential address. The telephone number can include a telephone number of a line from which the call is placed, or can include another telephone number. The information further includes service identification information indicative of which service or services are being ordered.

The telephone network element can provide a human operator to elicit the aforementioned information from the individual. The human operator can verbally elicit the information from the individual, receive the information in a verbal form from the individual, and enter the information into a terminal for storage by a database.

Alternatively, the telephone network element can include an intelligent peripheral capable of providing announcements, post-dialing digit collection, and/or speech recognition. In this case, the intelligent peripheral plays one or more announcements to elicit the information from the individual, receives the information in either a verbal form or in the form of dialed digits, decodes the information using either speech recognition or digit determination, and stores the information in a database record. In this way, the intelligent peripheral automatically determines the subscriber identification information and the service identification information from the individual.

As indicated by block 16, a step of communicating a terms and conditions message to the individual is performed. The terms and conditions message includes predetermined or prerecorded terms and conditions specific to the telecommunication service being ordered by the individual. The terms and conditions message is communicated within the telecommunication call.

Preferably, the terms and conditions message is included within an audio message. In this case, it is preferred that the terms and conditions message have a verbal or spoken form. The terms and conditions can include a prerecorded message spoken by an individual, or can include a voice-synthesized message. As an alternative to or in addition to the audio message, the terms and conditions message can include a visual message.

Regardless of its form, the terms and conditions message includes an instruction on how to accept the terms and conditions, how to reject the terms and conditions, how to replay the terms and conditions message, and how to initiate a transfer to a human operator if the individual has a question regarding the terms and conditions. Preferably, the instruction includes verbal or spoken information indicating a corresponding digit associated with each potential reply. It is noted that the digits can include digits 0 to 9, the # key, and the * key.

As indicated by block 18, a step of receiving a reply message from the individual is performed. Generally, the reply message includes an event or an action initiated by the individual. The reply message can include a dialed message comprised of one or more digits dialed by the individual. For example, the reply message can include a first digit indicating that the individual accepts the terms and conditions, a second digit indicating that the individual rejects the terms and conditions, a third digit indicating that the individual requests that the terms and conditions message be replayed, or a fourth digit indicating that the individual requests an operator.

As either an alternative to or an addition to the dialed message, the reply message can include a spoken message from the individual. For example, the reply message can include: (i) a first spoken message from the individual, such as "I accept" or "I agree" indicating acceptance of the terms and conditions; (ii) a second spoken message from the individual, such as "I do not accept" or "I do not agree", indicating non-acceptance of the terms and conditions; (iii) a third spoken message from the individual, such as "replay the message", indicating that the terms and conditions message is to be replayed; or (iv) a fourth spoken message from the individual, such as "operator" indicating that a human operator is requested.

As indicated by block 20, a step of determining the reply message is performed. The step of determining the reply message can include determining a digit dialed by the individual, and/or recognizing speech from the individual.

If the reply message affirmatively indicates acceptance of the terms and conditions, a step of creating a record in a database is performed as indicated by block 22. The record can include all of the information gathered in block 14, a time and a date at which the telecommunication service is ordered, and a calling party identification or an ANI (Automatic Numbering Identification) for the telecommunication call. Additionally, the record can include a digitally recorded representation of at least a portion of the call, and optionally of an entire portion of the call. In this way, an audio recording of the call can be made.

Thereafter, a step of communicating a written confirmation of the terms and conditions is performed as indicated by block 24. The written confirmation includes the information stored in the record, and the terms and conditions which were accepted. The written confirmation can be sent to the individual by mail, by a delivery service, or by fax.

If the reply message indicates non-acceptance of the terms and conditions, a step of transferring the call to either a terminating announcement or an operator is performed as indicated by block 26. The terminating announcement or the operator provides a verbal or spoken message indicating that the terms and conditions have been rejected, and that the telecommunication service will not be provided. After speaking with the operator, the individual may withdraw his/her non-acceptance of the terms and conditions. In this case, flow of the method can be directed back to either block 16 or block 18 to allow the individual to accept the terms and conditions.

If the reply message indicates that the terms and conditions message is to be replayed, flow of the method is directed back to block 16. In this way, the terms and conditions message is again communicated to the individual.

If the reply message indicates an operator is requested, a step of transferring the call to an operator is performed as indicated by block 30. After the operator or a like service representative has answered questions from the individual, flow of the method can be directed back to block 16 to replay the terms and conditions message to the individual.

The aforementioned method is repeated for a plurality of telecommunication calls. In this way, a plurality of orders for telecommunication services can be processed.

The aforementioned steps can be directed by computer-readable data stored by a computer-readable storage medium. The computer readable data can have the form of a computer program. The computer readable storage medium can include an optical storage medium, a magnetic storage medium, or an electronic storage medium.

Figure 2:
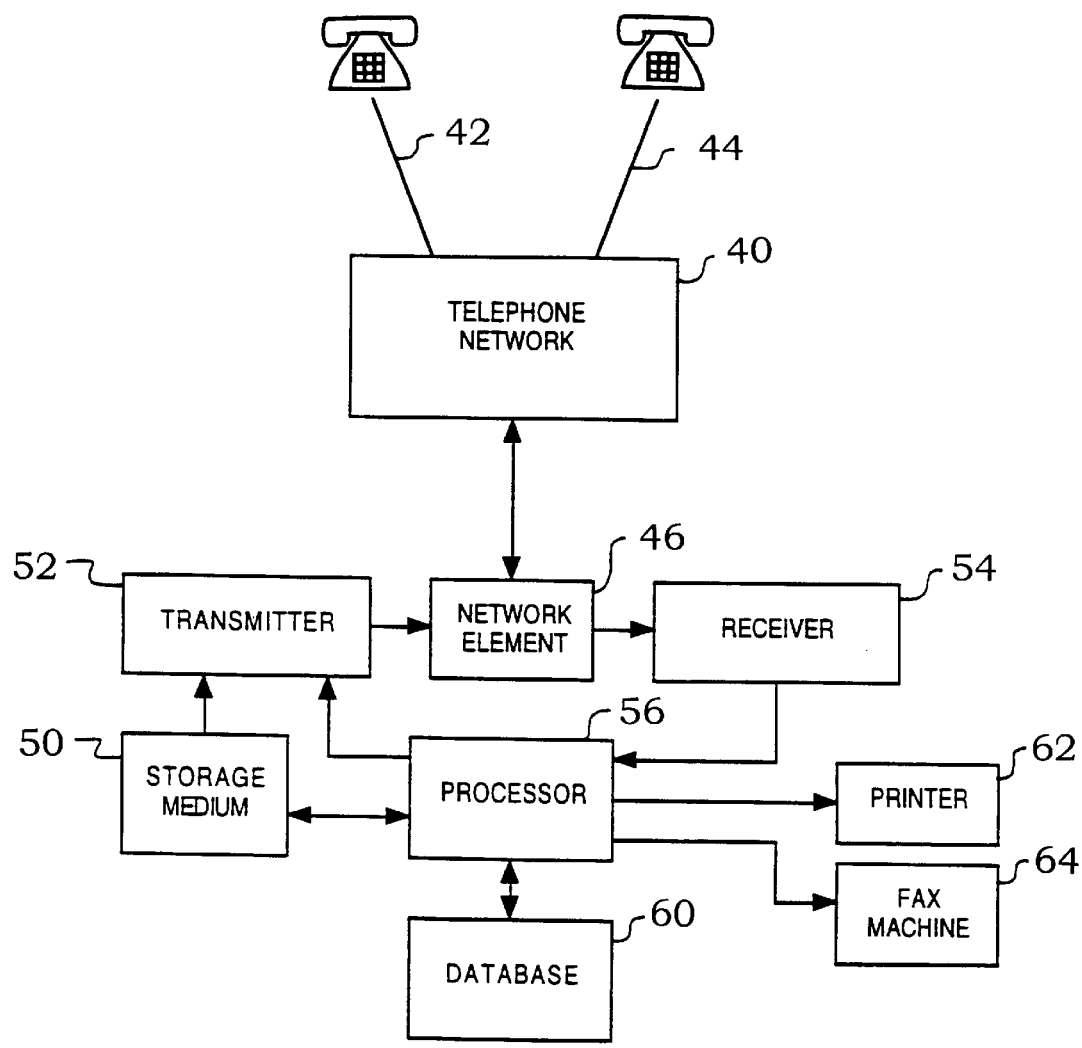
FIG. 2 is a block diagram of an embodiment of a system for processing an order for a telecommunication service.

FIG. 2 is a block diagram of an embodiment of a system for providing a session for ordering a telecommunication service. Preferably, the system performs the steps described with reference to FIG. 1.

The system includes a telephone network 40 which serves a plurality of telephone lines including a telephone line 42 and a telephone line 44. Preferably, the telephone network 40 includes at least a portion of a PSTN.

The telephone network 40 has a telephone network element 46 to receive a telecommunication call for ordering a telecommunication service. Preferably, the telephone network element 46 includes an intelligent peripheral (IP) as described earlier to perform service assistance functions such as announcements, post-dialing digit collection, and optionally speech recognition.

For purposes of illustration and example, the telephone service is ordered for the telephone line 42. In this case, it is noted that the telecommunication call can be placed either by the telephone line 42 or the telephone line 44.

Associated with the telephone network element 46 is a storage medium 50 having a prerecorded terms and conditions message for the telecommunication service. The storage medium 50 can include an electronic storage medium, such as a memory, a magnetic storage medium such as hard disk or a diskette, or an optical storage medium such as a compact disk (CD) or a digital versatile disk (DVD), to store a digital recording of the terms and conditions message. Alternatively, the storage medium 50 can include a magnetic storage medium such as an audio tape to store an analog recording of the terms and conditions message. Preferably, the storage medium 50 stores a plurality of terms and conditions messages, each corresponding to an associated telecommunication service.

A transmitter 52 is associated with the telephone network element 46 and the storage medium 50 to communicate the prerecorded terms and conditions message during the telecommunication call. A receiver 54 is associated with the telephone network element 46 to receive a reply message to the terms and conditions message during the telecommunication call.

A processor 56 associated with the telephone network element 46 processes the reply message from the receiver 54. The processor 56 can either determine digits entered by the individual in the reply message and/or words spoken by the individual. The processor 56 can include a computer or a like processing apparatus.

If the reply message is indicative of acceptance of the terms and conditions, the processor 56 creates a record of an accepted ordering session in a database 60. The record includes subscriber identification information, service identification information, a time and a date at which the telecommunication service is ordered, and calling party identification for the telecommunication call. Optionally, the record includes a recorded audio representation of at least a portion of the call.

The system further comprises at least one of a printer 62 and a facsimile machine 64 to generate a written confirmation of the terms and conditions. The printer 62 generates a hard copy of the written confirmation for delivery to the individual. The facsimile machine 64 faxes the written confirmation to the individual.

If the processor 56 determines the reply message is indicative of non-acceptance of the terms and conditions, the telephone network element 46 sends the telecommunication call to a terminating announcement. If the reply message indicates a replay request, the processor 56 commands the transmitter 52 to replay the terms and conditions message. If the reply message indicates a request for human assistance, the call is transferred to an operator.

Thus, there has been described herein a concept, as well as several embodiments including preferred embodiments of methods and systems for ordering a telecommunication service.

By communicating a terms and conditions message to an individual when he/she is ordering a telecommunication service, embodiments of the present invention advantageously convey the terms and conditions to the individual prior to completing the order. By requiring the individual to communicate a reply message, the order is completed only if the individual affirmatively accepts the terms and conditions. By creating and maintaining a record of the ordering session in a database, the acceptance of the terms and conditions is documented. As a result, the necessity for having customers sign individual contracts for their services is obviated. Further, the necessity for an administrative system to collect and archive paper contracts is obviated.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method comprising:
   receiving an order for a telecommunication service within a telecommunication call; and
   creating and maintaining a record of the order in a database, the record including a recorded audio representation of at least a portion of the telecommunication call which documents that an individual has affirmatively accepted a terms and conditions contract,
   wherein the step of creating the record is performed at least in part by a processor connected with a storage medium and with the database, and wherein the terms and conditions contract is stored in the storage medium.

2. The method of claim 1 wherein the recorded audio representation includes a digitally recorded representation of at least the portion of the telecommunication call in which the individual affirmatively accepts the terms and conditions contract.

3. The method of claim 1 wherein the record further includes calling party identification for the telecommunication call.

4. The method of claim 1 wherein the record further includes information identifying a subscriber of the telecommunication service.

5. The method of claim 1 wherein the record further includes information identifying the telecommunication service.

6. A method comprising:
   receiving an order for a telecommunication service within a telecommunication call; and
   creating and maintaining a record of the order in a database, the record including a recorded audio representation of a substantially entire portion of the telecommunication call which documents that an individual has affirmatively accepted a terms and conditions contract,
   wherein the step of creating the record is performed at least in part by a processor connected with a storage medium and with the database, and wherein the terms and conditions contract is stored in the storage medium.

7. The method of claim 6 wherein the recorded audio representation includes a digitally recorded representation of the entire portion of the telecommunication call.

8. The method of claim 6 wherein the record further includes calling party identification for the telecommunication call.

9. The method of claim 6 wherein the record further includes information identifying a subscriber of the telecommunication service.

10. The method of claim 6 wherein the record further includes information identifying the telecommunication service.

11. A database comprising a record of an order for a telecommunication service, the record including a recorded audio representation of at least a portion of a telecommunication call which documents that an individual has affirmatively accepted a terms and conditions contract for the telecommunication service,
    wherein a processor is connected with a storage medium and with the database, and wherein the terms and conditions contract is stored in the storage medium.

12. The database of claim 11 wherein the recorded audio representation includes a digitally recorded representation of at least the portion of the telecommunication call in which the individual affirmatively accepts the terms and conditions contract.

13. The database of claim 11 wherein the record further includes calling party identification for the telecommunication call.

14. The database of claim 11 wherein the record further includes information identifying a subscriber of the telecommunication service.

15. The database of claim 11 wherein the record further includes information identifying the telecommunication service.

16. A database comprising a record of an order for a telecommunication service, the record including a recorded audio representation of a substantially entire portion of a telecommunication call which documents that an individual has affirmatively accepted a terms and conditions contract for the telecommunication service,
    wherein a processor is connected with a storage medium and with the database, and wherein the terms and conditions contract is stored in the storage medium.

17. The database of claim 16 wherein the recorded audio representation includes a digitally recorded representation of the entire portion of the telecommunication call.

18. The database of claim 16 wherein the record further includes calling party identification for the telecommunication call.

19. The database of claim 16 wherein the record further includes information identifying a subscriber of the telecommunication service.

20. The database of claim 16 wherein the record further includes information identifying the telecommunication service.

21. A computer-readable medium whose contents direct a processor to create and maintain, in a database, a record of an order for a telecommunication service, the record including a recorded audio representation of at least a portion of a telecommunication call which documents that an individual has affirmatively accepted a terms and conditions contract for the telecommunication service, wherein the processor is connected with a storage medium and with the database, and wherein the terms and conditions contract is stored in the storage medium.

22. The computer readable medium of claim 21 wherein the recorded audio representation includes a digitally recorded representation of at least the portion of the telecommunication call in which the individual affirmatively accepts the terms and conditions contract.

23. The computer readable medium of claim 21 wherein the record further includes calling party identification for the telecommunication call.

24. The computer readable medium of claim 21 wherein the record further includes information identifying a subscriber of the telecommunication service.

25. The computer readable medium of claim 21 wherein the record further includes information identifying the telecommunication service.

26. A computer-readable medium whose contents direct a processor to create and maintain, in a database, a record of an order for a telecommunication service, the record including a recorded audio representation of a substantially entire portion of a telecommunication call which documents that an individual has affirmatively accepted a terms and conditions contract for the telecommunication service, wherein the processor is connected with a storage medium and with the database, and wherein the terms and conditions contract is stored in the storage medium.

27. The computer readable medium of claim 26 wherein the recorded audio representation includes a digitally recorded representation of the entire portion of the telecommunication call.

28. The computer readable medium of claim 26 wherein the record further includes calling party identification for the telecommunication call.

29. The computer readable medium of claim 26 wherein the record further includes information identifying a subscriber of the telecommunication service.

30. The computer readable medium of claim 26 wherein the record further includes information identifying the telecommunication service.

* * * * *